Patented Sept. 13, 1932

1,876,929

UNITED STATES PATENT OFFICE

RICHARD HERZ, OF FRANKFORT-ON-THE-MAIN, AND MAX SCHUBERT, OF FRANKFORT-ON-THE-MAIN-FECHENHEIM, GERMANY, ASSIGNORS TO GENERAL ANILINE WORKS, INC., OF NEW YORK, N. Y., A CORPORATION OF DELAWARE

PROCESS FOR PRODUCING 2-MERCAPTO-ARYLENE-THIAZOLE COMPOUNDS AND THE PRODUCTS

No Drawing. Application filed February 15, 1929, Serial No. 340,327, and in Germany February 24, 1928.

Our present invention relates to a process for producing 2-mercapto-arylene-thiazoles of the probable general formula:

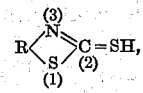

wherein R means an arylene residue which may contain further substituents, such as, for instance, halogen, alkyl-, alkoxy- amino- or arylamino-groups.

This process consists in acting with a thiocarbonic acid compound of the general formula:

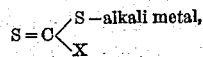

wherein X means -O-alkali metal, -S-alkali metal or -O-alkyl, either in situ or in substance in the presence of an alkali and advantageously with the addition of a reducing agent on an ortho-amino-aryl-sulfo-cyanogen compound of the general formula:

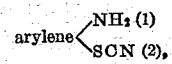

wherein "arylene" means a residue of the above-mentioned kind (see U. S. Patent No. 1,765,678).

As alkali sulfides act simultaneously as alkali and as reducing agents, further addition of alkali or of a reducing agent is not necessary in this case.

In order to apply the thiocarbonic acid compounds in situ, for instance, a trithiocarbonate may be substituted by carbon disulfide and alkali sulfide or a di-thio-carbonate by carbon disulfide and an alkali or a xanthogenate by carbon disulfide, alkali and alcohol.

It is a remarkable fact that the reaction is finished after a short time, in most cases already by warming the starting materials for some hours, and that completely pure products are obtained with an excellent yield in a smooth reaction.

The 2-mercapto-arylene-thiazoles, thus obtained, are identical with those obtained according to the process described in the U. S. Patent No. 1,847,514.

In order to further illustrate our invention, the following examples are given, the parts being by weight and all temperatures in centigrade degrees. We wish it however to be understood that we are not limited to the particular products nor reaction conditions mentioned therein.

Example 1

90 parts of 1-methyl-2-amino-3-sulfocyanogen-5-chloro-benzene are boiled in a solution of 160 parts of crystallized sodium sulfide in 1600 parts of water and 20 parts of carbon disulfide under a reflux condenser for several hours, 10 parts of carbon disulfide being advantageously added after some time. When cool the reaction mass is acidulated and the precipitate formed is filtered off. It is purified by dissolving it in a warm aqueous ammonia solution and precipitated therefrom by means of hydrochloric acid. The 2-mercapto-4-methyl-6-chloro-benzothiazole corresponds probably to the formula:

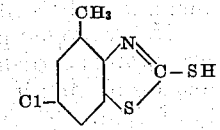

and represents, when recrystallized from benzene, colorless needles melting at 252°. It is identical with the product described in Example 2 of U. S. Patent No. 1,847,514.

Example 2

42 parts of 1-sulfocyanogen-2-amino-naphthalene are boiled in a solution of 160 parts of crystallized sodium sulfide in 800 parts of water and 20 parts of carbon disulfide under a reflux condenser for several hours, 10 parts of carbon disulfide being advantageously added after some time. The crystallized reaction product is filtered off when cool, dissolved in 500 parts of warm water and the free mercaptan is precipitated from this solution by means of dilute hydrochloric acid. The 2-mercapto-naphtho-thiazole is identical with the product of Example 4 of U. S. Patent No. 1,847,514 and with that described by Jakobsen and Frankenbacher (Berichte der deutschen chemischen Gesellschaft, Vol. 24, page 1408).

Example 3

45 parts of 2-amino-3-sulfocyanogen-1.5-dimethyl-benzene and 25 parts of sodium hydrosulfite are dissolved in the hot in 300 parts of alcohol and 75 parts of a caustic soda solution of 40% strength and the solution is boiled with the addition of 300 parts of water and 25 parts of carbon disulfide under a reflux condenser for about 1 hour. Then the alcohol is distilled off, the residue is digested with water, the undissolved part is filtered off and the filtrate thereof is acidulated. The precipitated reaction product is purified by dissolving it in a cold dilute caustic soda solution and the solution is precipitated with an acid. The 2-mercapto-4.6-dimethyl-benzothiazole of the probable formula:

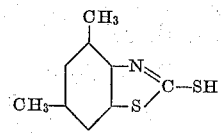

crystallizes from spirit in colorless needles melting at 263–265° as described in the U. S. Patent No. 1,635,193.

When 2-amino-3-sulfocyanogen-1.5-dimethyl-benzene is replaced by the same quantity of 4-amino-3-sulfocyanogen-1-methyl-benzene and the process is carried out otherwise in the same way, 2-mercapto-6-methyl-benzo-thiazole is obtained.

Example 4

When amino-disulfocyanogen compounds containing one sulfocyanogen group in the ortho-position relating to the amino-group are treated in the manner described in example 3, the other sulfo-cyanogen group is converted into a mercaptan or a disulfide residue besides the formation of the thiazole ring.

E. g. 36 parts of 2.4-disulfocyanogen-aniline, described in example 4 of the French Patent No. 620,799 dated August 26, 1926, are boiled with a solution of 160 parts of sodium sulfide in 800 parts of water and 15 parts of carbon-disulfide under a reflux condenser for several hours. The clear solution is acidified when cool and the precipitated reaction product is filtered off: For purification it is dissolved in a cold dilute caustic soda solution with the addition of some hydrosulfite and precipitated from this solution with a dilute acid. The new compond, thus obtained, being probably 2.6-dimercaptobenzothiazole of the formula:

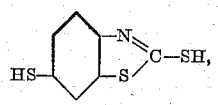

crystallized from dilute acetone in colorless needles melting at 275°.

In an analogous manner 2.4-disulfocyanogen-1-amino-naphthalene, described in example 9 of the French Patent No. 620,799, yields the corresponding dimercapto-naphtho-thiazole.

In an analogous manner 1-methoxy-4-amino-3-sulfocyanogeno-benzene yields the 6-methoxy-2-mercapto-benzo-thiazole of about 205° melting point. By starting from 1.3-dimethyl-4-chloro-6-amino-5-sulfocyanogenobenzene and 1.3-dimethyl-2.4-dichloro-6-amino-5-sulfocyanogeno-benzene accordingly, 4.6-dimethyl-7-chloro-2-mercapto-benzothiazole of about 305° melting point and 4.6-dimethyl-5.7-dichloro-2-mercapto-benzothiazole respectively of about 290° melting point are obtained. All these compounds are new.

We claim:

1. A process which comprises acting with a thiocarbonic acid compound of the general formula:

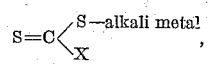

wherein X means -O-alkali metal, -S-alkali metal- or -O-alkyl, in presence of an alkali on an otho-aminoaryl-sulfocyanogen compound of the general formula:

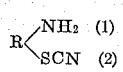

wherein R means naphthalene or a radical of the benzene series which may contain chlorine, methyl or methoxy.

2. A process which comprises acting with a thiocarbonic acid compound of the general formula:

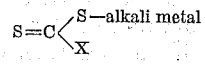

wherein X means O-alkali metal, -S-alkali metal- or O-alkyl, in presence of an alkaline reducing agent on an othro-aminoaryl-sulfocyanogen compound of the general formula:

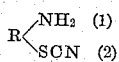

wherein R means naphthalene or a radical of the benzene series which may contain chlorine, methyl or methoxy.

3. A process which comprises acting with a thiocarbonic acid compound of the general formula:

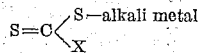

wherein X means O-alkali metal, -S-alkali metal- or -O-alkyl produced in situ presence of an alkali on an ortho-aminoaryl-sulfocyanogen compound of the general formula:

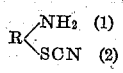

wherein R means naphthalene or a radical of the benzene series which may contain chlorine, methyl or methoxy.

4. A process which comprises acting with a thiocarbonic acid compound of the general formula:

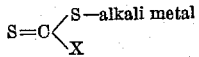

wherein X means -O-alkali metal-, -S-alkali metal- or O-alkyl produced in situ, in presence of an alkaline reducing agent on an ortho-aminoaryl-sulfocyanogen compound of the general formula:

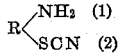

wherein R means naphthalene or a radical of the benzene series which may contain chlorine, methyl or methoxy.

5. A process which comprises acting with an alkali metal salt of the trithiocarbonic acid in presence on an alkaline reducing agent on an ortho-aminoaryl-sulfocyanogen compound of the general formula:

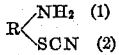

wherein R means naphthalene or a radical of the benzene series which may contain chlorine, methyl or methoxy.

6. A process which comprises acting with an alkali-sulfide and carbon-disulfide on an ortho-aminoaryl-sulfocyanogen compound of the general formula:

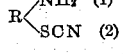

wherein R means naphthalene or a radical of the benzene series which may contain chlorine, methyl or methoxy.

7. As new compounds the chlorinated 4.6-dimethyl-2-mercapto-benzothiazoles corresponding to the general formula:

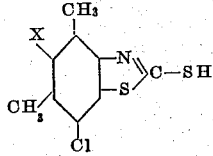

wherein X stands for hydrogen or chlorine, which compounds melt between about 290 and 305° C.

In testimony whereof, we affix our signatures.

RICHARD HERZ.
MAX SCHUBERT.